United States Patent [19]

Hari et al.

[11] Patent Number: 4,980,458
[45] Date of Patent: Dec. 25, 1990

[54] MIXED SODIUM, AMMONIUM AND/OR CALCIUM SALT CRYSTALS OF LAKED MONOAZO DISULFONATED PYRAZOLONE PIGMENTS

[75] Inventors: Stefan Hari, Villars-sur-Glâne; Arnold Grubenmann, Marly; Andreas Burkhard, Basel, all of Switzerland

[73] Assignee: Ciba-Geigy Corporation, Ardsley, N.Y.

[21] Appl. No.: 349,907

[22] Filed: May 8, 1989

Related U.S. Application Data

[63] Continuation of Ser. No. 100,876, Sep. 25, 1987.

[30] Foreign Application Priority Data

Oct. 3, 1986 [CH] Switzerland .................. 3961/86

[51] Int. Cl.$^5$ .................. C09B 67/22; C09B 63/00; C09B 29/50; C09B 29/01
[52] U.S. Cl. .................. 534/575; 534/573; 534/712; 534/784; 534/887; 8/641; 106/494; 106/496
[58] Field of Search .................. 534/573 M, 573, 712, 534/784; 8/641; 106/288 Q, 494, 496

[56] References Cited

U.S. PATENT DOCUMENTS

| | | | |
|---|---|---|---|
| 935,830 | 6/1909 | Volkmann I | 534/784 |
| 969,428 | 9/1910 | Volkmann II | 534/784 |
| 1,098,600 | 10/1914 | Volkmann III | 534/784 |
| 1,701,248 | 2/1929 | Wagner et al. | 534/784 |
| 1,730,179 | 10/1929 | Wagner II et al. | 534/784 |
| 1,830,300 | 11/1931 | Tisza et al. | 534/887 X |
| 2,237,768 | 4/1941 | Scudi | 534/573 M X |
| 2,457,823 | 1/1949 | Kendall et al. | 534/887 X |
| 2,842,537 | 7/1958 | Strobel et al. | 534/784 |
| 2,937,165 | 5/1960 | Fiess | 534/573 X |
| 3,905,952 | 9/1975 | Speck | 534/780 X |

FOREIGN PATENT DOCUMENTS

| | | | |
|---|---|---|---|
| 2106085 | 8/1971 | Fed. Rep. of Germany | 534/784 |
| 3133404 | 3/1983 | Fed. Rep. of Germany | 534/784 |

Primary Examiner—Floyd D. Higel
Attorney, Agent, or Firm—Luther A. R. Hall

[57] ABSTRACT

Mixed crystals of at least two different compounds of formula I

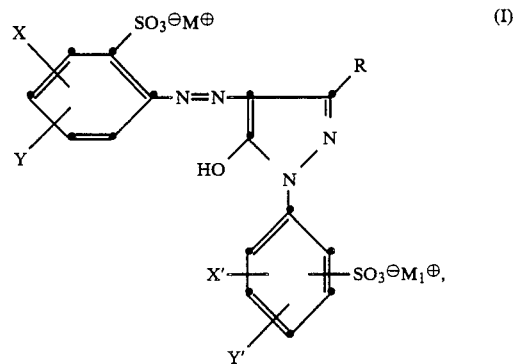

wherein
R is $-CH_3$, phenyl, $-COOCH_3$, $-COOCH_3$, $-COOC_2H_5$, $-NHCO-C_1-C_4$ alkyl or $-CONH-C_1-C_4$ alkyl, $M^+$ and $M_1^+$ are each independently of the other an alkali metal cation, an alkaline earth metal cation or a heavy metal cation or $NH_4^+$; wherein X, Y, X' and Y' are each independently hydrogen, halogen, $-CH_3$, $-C_2H_5$, $-OCH_3$, $-OC_2H_5$, $-NO_2$ or the group of formula $-NHCO-C_1-C_4$ alkyl, wherein at least two of the cations $M^+$ and $M_1^+$ in the compounds forming the mixed crystals of formula I are different and the X-ray diffraction patterns of the mixed crystals differ from the X-ray diffraction patterns of the individual components and of their sum. Such mixed crystals are most suitable as pigments for coloring high molecular organic material and are distinguished in particular by surprisingly high color strength and pure shade.

2 Claims, No Drawings

MIXED SODIUM, AMMONIUM AND/OR CALCIUM SALT CRYSTALS OF LAKED MONOAZO DISULFONATED PYRAZOLONE PIGMENTS

This is a continuation of application Ser. No. 100,876, filed on Sept. 25, 1987, now abandoned.

The present invention relates to mixed crystals of laked azo dyes of the pyrazolone series, to their preparation, and to the use thereof for colouring high molecular organic material.

Metal and amine salts of azo compounds of the pyrazolone series are known. Thus, for example, German Offenlegungsschrift specifications Nos. 26 16 981 and 33 18 073 disclose metal salts and European patent application EP-A No. 73 972 discloses ammonium salts of sulfonated azo dyes of the pyrazolone series. Such compounds are used as pigments for colouring plastics.

It has now been found that mixed crystals of laked azo dyes of the pyrazolone series are pigments which, by virtue of their good texture, are distinguished by good dispersibility and, in addition, exhibit good fastness to heat, light and weathering and have, in particular, surprisingly high colour strength, opacity and pure shade.

The present invention relates to mixed crystals containing at least two different compounds of formula I

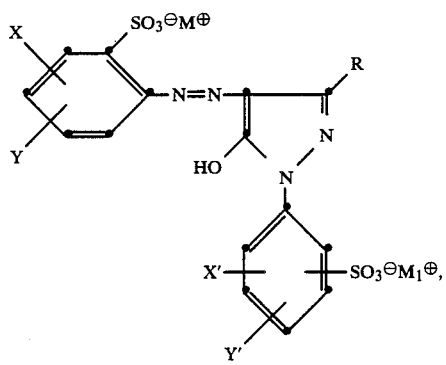

wherein R is —CH$_3$, phenyl, —COOCH$_3$, —COOC$_2$H$_5$, —NHCO—C$_1$-C$_4$ alkyl or —CONH—C$_1$-C$_4$ alkyl, M$^+$ and M$_1^+$ are each independently of the other an alkali metal cation, an alkaline earth metal cation or a heavy metal cation or NH$_4^+$; wherein X, Y, X' and Y' are each independently of the other hydrogen, halogen, —CH$_3$, —C$_2$H$_5$, —OCH$_3$, —OC$_2$H$_5$, —NO$_2$ or the group of formula —NHCO—C$_1$-C$_4$ alkyl, wherein at least two of the cations M$^+$ and M$_1^+$ in the compounds of formula I forming the mixed crystals are different and the X-ray diffraction patterns of the mixed crystals differ from the X-ray diffraction patterns of the individual components and of their sum.

C$_1$-C$_4$ alkyl in the radicals —NHCO—C$_1$-C$_4$ alkyl and —CONH—C$_1$-C$_4$ alkyl is for example methyl, ethyl, n-propyl, isopropyl, n-butyl and tert-butyl. Methyl is preferred.

X, Y, X' and Y' as halogen are fluorine, chlorine, bromine and iodine, in particular chlorine and bromine, preferably chlorine.

Cations M$^+$ and M$_1^+$ are for example Li$^+$, (Sr/2)$^+$, (Ba/2)$^+$, (Mg/2)$^+$, (Mn/2)$^+$, (Ni/2)$^+$, (Co/2)$^+$, (Cu/2)$^+$, (Zn/2)$^+$ and in particular Na$^+$, K$^+$, NH$_4^+$ and (Ca/2)$^+$.

Particularly interesting mixed crystals are those of at least two different compounds of formula II

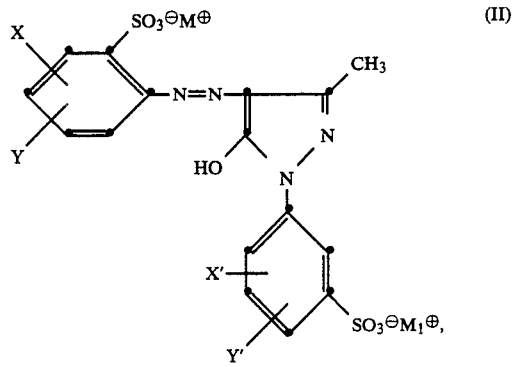

wherein M$^+$, M$_1^+$, X, Y, X' and Y' are each independently as defined above.

Preferred mixed crystals are those of at least two different compounds of formula III

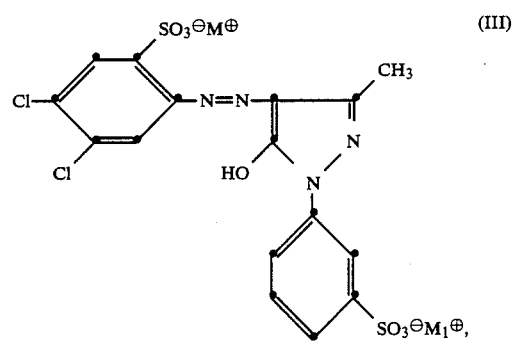

wherein M$^+$ and M$_1^+$ are each independently of the other as defined above.

Particularly preferred mixed crystals are those of at least two different compounds of formula III, wherein M$^+$ and M$_1^+$ are each independently of the other K$^+$, NH$_4^+$ and, in particular, Na$^+$ or (Ca/2)$^+$.

The preparation of the mixed crystals of the invention is effected for example (a) by recrystallisation of a crude pigment obtained for example by diazotization of an amine of formula IV

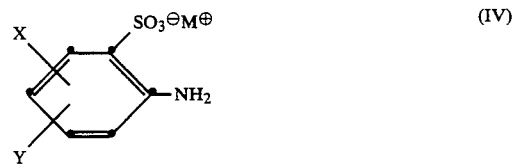

with an aqueous solution of a nitrite of formula

and reaction of the resultant diazo compound with a coupling component of formula V

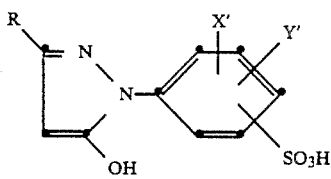

in an aqueous acidic solvent mixture, wherein R, $M^+$, $M_1^+$, X, Y, X' and Y' are as defined above.

Examples of amines of formula IV are:
2-aminobenzenesulfonic acid, 2-amino-5-acetylaminobenzenesulfonic acid, 2-amino-5-ethoxybenzenesulfonic acid, 2-amino-5-chlorobenzenesulfonic acid, 2-amino-5-methoxybenzenesulfonic acid, 2-amino-5-methylbenzenesulfonic acid, 2-amino-5-nitrobenzenesulfonic acid, 2-amino-4,5-dichlorobenzenesulfonic acid, 2-amino-4-methyl-5-chlorobenzenesulfonic acid, 2-amino-4-chloro-5-methylbenzenesulfonic acid, 2-amino-3,5-dichlorobenzenesulfonic acid, 2-amino-3-methyl-5-chlorobenzenesulfonic acid, 2-amino-3,5-dinitrobenzenesulfonic acid, 2-amino-3-chloro-5-nitrobenzenesulfonic acid, 2-amino-3,5-dimethylbenzenesulfonic acid, 3-amino-4-methoxybenzenesulfonic acid, 2-amino-4-acetylaminobenzenesulfonic acid, 2-amino-4-chlorobenzenesulfonic acid.

Examples of coupling components of formula V are:
1-(2'-sulfophenyl)-3-methylpyrazol-5-one, 1-(4',5'-dichloro-2'-sulfophenyl)-3-methylpyrazol-5-one, 1-(3'-sulfophenyl)-3-methylpyrazol-5-one, 1-(6'-chloro-3'-sulfophenyl)-3-methylpyrazol-5-one, 1-(4'-sulfophenyl)-3-methylpyrazol-5-one, 1-(2'-chloro-6'-methyl-4'-sulfophenyl)-3-methylpyrazol-5-one, 1-(2'-methyl-4'-sulfophenyl)-3-methylpyrazol-5-one, 1-(2',5'-dichloro-4'-sulfophenyl)-3-methyl-pyrazol-5-one, 1-(3'-sulfophenyl)-3-carbomethoxypyrazol-5-one, 1-(2',5'-dichloro-4'-sulfophenyl)-3-carbomethoxypyrazol-5-one, 1-(3'-sulfophenyl)-3-carboethoxypyrazol-5-one, 1-(2',5'-dichloro-4'-sulfophenyl)-3-carboethoxypyrazol-5-one, 1-(3'-sulfophenyl)-3-aminopyrazol-5-one, 1-(2',5'-dichloro-4'-sulfophenyl)-3-amino-pyrazol-5-one, 1-(3'-sulfophenyl)-3-acetylaminopyrazol-5-one, 1-(2',5'-dichloro-4'-sulfophenyl)-3-acetylaminopyrazol-5-one.

It is also (b) possible to react a disulfonic acid of formula VI

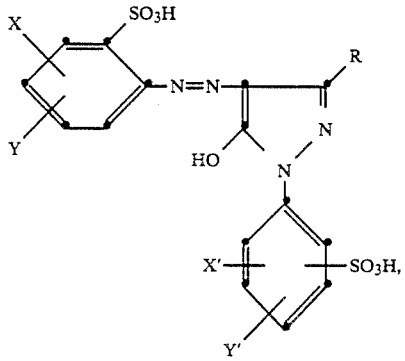

wherein R, X, Y, X' and Y' have the meanings given above, with a mixture of an M salt and an $M_1$ salt in water and then to subject the resultant product for at least 2 hours in the temperature range from 60° to 100° C. to a per se known after-treatment for pigments.

Examples of M salts and $M_1$ salts are: nitrates, nitrites, sulfates, alkali metal hydroxides and preferably chlorides and, in particular, acetates of the above mentioned cations $M^+$ and $M_1^+$.

The disulfonic acids of formula VI may be prepared according to per se known processes.

A further variant (c) for preparing the preferred mixed crystals of the invention comprises reacting a suspension of a component of formula I in water with an M salt having a different $M^+$, for example in a molar ratio of 1:2 and in the temperature range from 60° to 100° C., preferably from 75° to 85° C., and with continuous stirring.

A variant (d) for the preparation of the mixed crystals of the invention from two different compounds of formula I, wherein $M^+$ and $M_1^+$ are the same, comprises recrystallising jointly two individual components of formula I which differ from each other by virtue of their cations $M^+$ according to per se known methods for pigments.

Individual components of formula I, wherein $M^+$ and $M_1^+$ are the same, are known and may for example be prepared as described in German Offenlegungsschrift No. 26 16 981.

Mixed crystals are characterized by their X-ray diffraction pattern which differs both from that of the individual components of the mixed crystal and also from those of their physical mixture.

The X-ray diffraction pattern of the mixed crystals of the invention is characterised by lines different from those which characterise the X-ray diffraction patterns of the corresponding physical mixture and of the corresponding individual components.

The recrystallisation or thermal treatment is carried out by the conventional methods employed for pigments. This treatment is normally a thermal after-treatment in water or in an organic solvent under normal or elevated pressure. It is preferred to use organic solvents, e.g. benzenes substituted by halogen atoms or by alkyl or nitro groups, e.g. xylenes, chlorobenzene, o-dichlorobenzene or nitrobenzene, as well as pyridine bases such as pyridine, picoline or quinoline, and also ketones such as cyclohexanone, alcohols such as isopropanol, butanols or pentanols, ethers such as ethylene glycol monomethyl or monoethyl ether, amides such as dimethylformamide or N-methylpyrrolidone, as well as dimethylsulfoxide or sulfolane. The after-treatment may also be carried out in water, under normal or elevated pressure, in the presence of organic solvents and/or with the addition of surface-active substances.

The mixed crystals of the invention may also be used as pigments for colouring high molecular organic material.

Examples of high molecular organic materials which may be coloured or pigmented with the mixed crystals of the invention are cellulose ethers and esters such as ethyl cellulose, nitrocellulose, cellulose acetate, cellulose butyrate, natural resins or synthetic resins such as polymerisation resins or condensation resins, for example aminoplasts, in particular urea/formaldehyde and melamine/formaldehyde resins, alkyd resins, phenolic plastics, polycarbonates, polyolefines, polystyrene, polyvinylchloride, polyamides, polyurethanes, polyesters, ABS, polyphenylene oxides, rubber, casein, silicone and silicone resins, singly or in mixtures.

The mixed crystals of the invention are particularly suitable for colouring polyvinylchloride and polyolefines such as polyethylene and polypropylene.

The above high molecular organic compounds may be used singly or as mixtures in the form of plastics, melts or in the form of spinning solutions, varnishes, paints or printing inks. Depending on the end use, it is advantageous to use the mixed crystals of the invention as toners or in the form of preparations.

The mixed crystals of the invention may be used in an amount of 0.01 to 30% by weight, preferably 0.1 to 10% by weight, based on the high molecular organic material to be pigmented.

The pigmenting of the high molecular organic substances with the mixed crystals of the invention is carried out for example by incorporating such mixed crystals, optionally in the form of a masterbatch, into the substrates using roll mills, mixing or grinding machines.

The pigmented material is then brought into the desired final form by methods which are known per se, for example calendering, moulding, extruding, coating, casting or by injection moulding. It is often desirable to incorporate plasticisers into the high molecular compounds before processing to produce non-brittle mouldings or to diminish their brittleness. Suitable plasticisers are for example esters of phosphoric acid, phthalic acid or sebacic acid.

The plasticisers may be incorporated before or after incorporating the mixed crystals of the invention into the polymers. To obtain different shades, it is also possible to add fillers or other chromophoric components such as white, coloured or black pigments, in any amount, to the high molecular organic compounds, in addition to the mixed crystals of the invention.

For pigmenting varnishes, paints and printing inks, the high molecular organic materials and the mixed crystals of the invention, together with optional additives such as fillers, other pigments, siccatives or plasticisers, are finely dispersed or dissolved in a common organic solvent or mixture of solvents. The procedure may be such that the individual components by themselves, or also several jointly, are dispersed or dissolved in the solvent and subsequently all the components are mixed.

The colourations obtained with the mixed crystals of the invention in, for example, polyvinylchloride or polyolefins are distinguished by good general pigment properties such as good dispersibility, high colour strength and purity, and good fastness to migration, heat, light and weathering.

The invention is illustrated by the following Examples wherein parts are by weight, unless otherwise stated.

EXAMPLE 1

2.6 parts of 2-amino-4,5-dichlorobenzenesulfonic acid calcium salt and 2.7 parts 1-(3-sulfophenyl)-3-methylpyrazol-5-one are dissolved at 30° C. in a mixture of 55 parts by volume of dimethylformamide, 55 parts of distilled water and 55 parts by volume of acetic acid. The orange solution is treated dropwise at 26° C. over 10 minutes with 2.55 parts by volume of 4N sodium nitrite solution. An orange precipitate forms and the temperature rises to 28° C. After stirring for 5 hours the temperature falls to 23° C. The orange suspension is filtered with suction. The residue is thoroughly pressed, washed with 100 parts of deionised water and vacuum dried at 60° C. There are obtained 4.5 parts of an orange powder which is subsequently recrystallised for 2 hours in 100 parts by volume of sec-butyl alcohol-water (1:1).

The resultant deep orange powder corresponds to the empirical formula $$C_{16}H_{10}Cl_2N_4O_7S_2NaCa/2 \cdot H_2O$$

Analysis theory (in %): C 33.93; H 2.20; Cl 12.50; N 9.89; S 11.32; Ca 3.54; Na 4.06;

found (in %): C 34.03; H 2.21; Cl 12.51; N 9.90; S 11.27; Ca 3.91; Na 4.10.

The X-ray diffraction pattern of this mixed crystal differs both from that of the individual components of the mixed crystal and also from that of its physical mixture.

The diffraction pattern is recorded on film to determine the interplanar spacing (d-values). Recording is made with a Guinier camera (Enraf-Nonius Guinier-de Wolff® camera No. II) and Cu-K-alpha-radiation (wavelength = 1.54178 Å). The d-values of the heaviest lines (d>3.0 Å) are set out in the following table together with the relative line intensities estimated visually.

| d-value in Å | Intensity |
| --- | --- |
| 10.5 | very strong |
| 9.8 | very weak |
| 8.8 | weak |
| 8.1 | medium |
| 7.9 | weak |
| 5.87 | medium |
| 5.47 | strong |
| 5.19 | medium |
| 4.86 | weak |
| 4.72 | very strong |
| 4.59 | strong |
| 4.44 | very weak |
| 4.39 | weak |
| 4.25 | very strong |
| 4.16 | very strong |
| 4.08 | medium |
| 3.95 | weak |
| 3.88 | weak |
| 3.83 | strong |
| 3.65 | medium |
| 3.48 | very strong |
| 3.45 | very strong |
| 3.36 | strong |
| 3.32 | medium |
| 3.07 | very strong |
| 3.04 | strong |

EXAMPLE 2

6.1 parts of the azo compound of formula VII

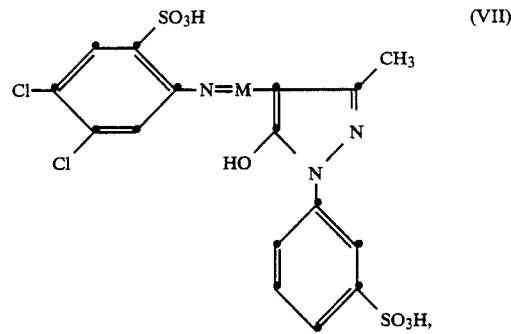

(VII)

are dissolved in 80 parts of deionised water at 70° C. A dark orange solution is formed. To this solution is added over 5 minutes a solution of 0.8 parts of calcium acetate and 0.8 parts of sodium acetate in 20 parts of distilled water. The resultant orange suspension is stirred for 2 hours at 70° C., allowed to cool to room temperature and filtered. The residue is washed with 100 parts of deionised water and dried under vacuum at 60° C. There are obtained 4.7 parts of an orange powder exhibiting the same properties as the product of Example 1.

| Metal analysis: | Ca | Na |
|---|---|---|
| theory | 3.54% | 4.06% |
| found | 3.94% | 3.69% |

EXAMPLE 3

6.7 parts of a 41% disodium salt of the compound of formula III ($M^+ = M_1^+ = Na^+$) and 4.4 parts of a 44% dicalcium salt ($M^+ = M_1^+ = (Ca/2)^+$) are heated in 100 parts of distilled water to 80° C. The thickening orange suspension is stirred at this temperature for 16 hours, cooled to room temperature, and a solution of 0.6 parts of sodium chloride and 0.6 parts of calcium chloride in 10 parts of distilled water is added to effect readier filtration. After filtration with suction, the residue is washed with deionised water and dried under vacuum at 60° C. There are obtained 4.6 parts of an orange powder which exhibits the same properties as the product of Example 1.

| Metal analysis | Ca | Na |
|---|---|---|
| theory | 3.54% | 4.06% |
| found | 3.20% | 4.59% |

The following table sets out the d-values determined for this product according to the method described in Example 1.

| d-value in Å | Intensity |
|---|---|
| 10.5 | very strong |
| 9.9 | very weak |
| 9.4 | very weak |
| 8.9 | medium |
| 8.2 | strong |
| 7.9 | medium |
| 5.90 | strong |
| 5.49 | strong |
| 5.20 | medium |
| 5.04 | strong |
| 4.73 | very strong |
| 4.61 | strong |
| 4.46 | very weak |
| 4.39 | very weak |
| 4.26 | very strong |
| 4.17 | very strong |
| 4.08 | weak |
| 3.96 | medium |
| 3.89 | very weak |
| 3.84 | strong |
| 3.67 | medium |
| 3.49 | very strong |
| 3.46 | very strong |
| 3.39 | strong |
| 3.34 | weak |
| 3.31 | weak |
| 3.21 | weak |
| 3.08 | strong |
| 3.06 | strong |

EXAMPLE 4

5.45 parts of the calcium salt of the compound of formula III ($M^+ = M_1^+ = (Ca/2)^+$) are heated in 80 parts of deionised water to 80° C. To the orange suspension is added a solution of 1.2 parts of NaCl in 20 parts of water. The mixture is stirred for 16 hours at 80° C. and filtered hot with suction. The residue is washed with 100 parts of water and dried under vacuum at 60° C. The yield is 5.2 parts (94.1% of theory) of an orange powder.

This product substantially corresponds to the product obtained according to Example 3 and colours polyvinyl chloride and polyethylene in strong yellow shades. The d-values determined for this product as described in Example 1 are listed in the following table.

| d-value in Å | Intensity |
|---|---|
| 10.5 | very strong |
| 9.9 | very weak |
| 8.8 | medium |
| 8.1 | medium |
| 7.9 | weak |
| 5.88 | strong |
| 5.49 | strong |
| 5.19 | weak |
| 4.86 | meium |
| 4.72 | very strong |
| 4.59 | medium |
| 4.41 | weak |
| 4.26 | very strong |
| 4.17 | very strong |
| 4.08 | weak |
| 3.95 | weak |
| 3.88 | very weak |
| 3.84 | strong |
| 3.66 | medium |
| 3.49 | medium |
| 3.45 | very strong |
| 3.37 | strong |
| 3.32 | medium |
| 3.07 | strong |
| 3.05 | strong |

EXAMPLE 5

15.35 parts of a 36% disodium salt of the compound of formula III ($M^+ = M_1^+ = Na^+$) are heated in 80 parts of deionised water to 80° C. and a solution of 0.75 parts of calcium chloride in 20 parts of distilled water is added, whereupon the mixture thickens. The thick orange suspension is stirred for 16 hours at 80° C. and filtered hot. The residue is washed with deionised water and dried under vacuum at 60° C. The yield is 5.5 parts (100% of theory) of an orange powder having properties similar to those of the product of Example 1.

| Metal analysis | Ca | Na |
|---|---|---|
| theory | 3.54% | 4.06% |
| found | 3.50% | 4.42% |

EXAMPLE 6

11.5 parts of the 47% diammonium salt of the compound of formula III ($M^+ = M_1^+ = NH_4^+$), 21 parts of sodium chloride and 12 parts of calcium chloride are heated to 79° C. in 160 parts of deionised water, stirred at this temperature for 16 hours and worked up as described in Example 5. There are obtained 5.25 parts (92.5% of theory) of an orange powder having properties similar to those of the product of Example 1.

| Metal analysis | Ca | Na |
|---|---|---|
| theory | 3.54% | 4.06% |
| found | 3.78% | 4.20% |

EXAMPLE 7

2.4 parts of 2-amino-4,5-dichlorobenzenesulfonic acid are stirred in 50 parts of deionised water for 10 minutes and treated with 1.145 parts of 90% tert-butylnitrite. The beige suspension is stirred for one hour at room temperature and then there are added in succession 2.8 parts of 90.1% 1-(3-sulfophenyl)-3-methylpyrazol-5-one and a solution of 0.8 parts of calcium acetate and 0.8 parts of sodium acetate in 50 parts of distilled water. An orange precipitate forms. The orange suspension is stirred for 5 hours at room temperature, 2 hours at 80° C. and filtered hot. The residue is washed with deionised water and dried under vacuum at 60° C. There are obtained 5.25 parts (95% of theory) of an orange powder which has substantially the same properties as the product of Example 1.

| Metal analysis | Ca | Na |
|---|---|---|
| theory | 3.54% | 4.06% |
| found | 3.44% | 3.96% |

EXAMPLES 8–35

Further mixed crystals of the invention can be obtained in analagous manner, starting from the amines listed in the following table (column 2), coupling components (column 3) and cations (column 4).

| Example No. | Amine | Coupling component | Cations | Shade in soft PVC (0.2% pigment concentration) |
|---|---|---|---|---|
| 8 | 4,5-dichloro-2-aminobenzenesulfonic acid | 1-(3-sulfophenyl)-3-methylpyrazol-5-one | $Ca^{2\oplus} + NH_4^{\oplus}$ | yellow |
| 9 | 4,5-dichloro-2-aminobenzenesulfonic acid | 1-(3-sulfophenyl)-3-methylpyrazol-5-one | $Ca^{2\oplus} + K^{\oplus}$ | yellow |
| 10 | 4,5-dichloro-2-aminobenzenesulfonic acid | 1-(3-sulfophenyl)-3-methylpyrazol-5-one | $Ca^{2\oplus} + Cs^{\oplus}$ | yellow |

-continued

| Example No. | Amine | Coupling component | Cations | Shade in soft PVC (0.2% pigment concentration) |
|---|---|---|---|---|
| 11 | 2-amino-4,5-dichlorobenzenesulfonic acid | 1-(4-sulfophenyl)-3-methyl-5-hydroxypyrazole azo | $Na^{\oplus} + Mg^{2\oplus}$ | greenish yellow |
| 12 | 2-amino-4,5-dichlorobenzenesulfonic acid | 1-(4-sulfophenyl)-3-methyl-5-hydroxypyrazole azo | $Na^{\oplus} + Mn^{2\oplus}$ | greenish yellow |
| 13 | 2-amino-4,5-dichlorobenzenesulfonic acid | 1-(4-sulfophenyl)-3-methyl-5-hydroxypyrazole azo | $Na^{\oplus} + Zn^{2\oplus}$ | greenish yellow |
| 14 | 2-amino-4,5-dichlorobenzenesulfonic acid | 1-(4-sulfophenyl)-3-methyl-5-hydroxypyrazole azo | $Na^{\oplus} + Sr^{2\oplus}$ | greenish yellow |
| 15 | 2-amino-4,5-dichlorobenzenesulfonic acid | 1-(3-sulfophenyl)-3-methyl-5-hydroxypyrazole azo | $Na^{\oplus} + Ba^{2\oplus}$ | yellow |

-continued

| Example No. | Amine | Coupling component | Cations | Shade in soft PVC (0.2% pigment concentration) |
|---|---|---|---|---|
| 16 | 2-amino-4,5-dichlorobenzenesulfonic acid | 1-(3-sulfophenyl)-3-methyl-5-hydroxypyrazole | $Na^{\oplus} + Cs^{\oplus}$ | greenish yellow |
| 17 | 2-amino-4,5-dichlorobenzenesulfonic acid | 1-(3-sulfophenyl)-3-methyl-5-hydroxypyrazole | $Ca^{2\oplus} + Mg^{2\oplus}$ | yellow |
| 18 | 2-amino-4,5-dichlorobenzenesulfonic acid | 1-(3-sulfophenyl)-3-methyl-5-hydroxypyrazole | $Ca^{2\oplus} + Mn^{2\oplus}$ | yellow |
| 19 | 2-amino-4,5-dichlorobenzenesulfonic acid | 1-(3-sulfophenyl)-3-methyl-5-hydroxypyrazole | $Ca^{2\oplus} + Zn^{2\oplus}$ | yellow |
| 20 | 2-amino-4,5-dichlorobenzenesulfonic acid | 1-(3-sulfophenyl)-3-methyl-5-hydroxypyrazole | $Ca^{2\oplus} + Sr^{2\oplus}$ | yellow |

-continued

| Example No. | Amine | Coupling component | Cations | Shade in soft PVC (0.2% pigment concentration) |
|---|---|---|---|---|
| 21 | 4,5-dichloro-2-aminobenzenesulfonic acid | 1-(3-sulfophenyl)-3-methyl-5-hydroxypyrazole | $Ca^{2+} + Ba^{2+}$ | yellow |
| 22 | 4,5-dichloro-2-aminobenzenesulfonic acid | 1-(3-sulfophenyl)-3-methyl-5-hydroxypyrazole | $Sr^{2+} + Ba^{2+}$ | yellowish orange |
| 23 | 5-methyl-4-chloro-2-aminobenzenesulfonic acid | 1-(3-sulfophenyl)-3-methyl-5-hydroxypyrazole | $Ca^{2+} + Mn^{2+}$ | yellow |
| 24 | 5-methyl-4-chloro-2-aminobenzenesulfonic acid | 1-(3-sulfophenyl)-3-methyl-5-hydroxypyrazole | $Na^{+} + Ca^{2+}$ | yellow |
| 25 | 4-chloro-5-methyl-2-aminobenzenesulfonic acid | 1-(3-sulfophenyl)-3-methyl-5-hydroxypyrazole | $Ca^{2+} + Mn^{2+}$ | greenish yellow |

-continued

| Example No. | Amine | Coupling component | Cations | Shade in soft PVC (0.2% pigment concentration) |
|---|---|---|---|---|
| 26 | 2-amino-4,5-dimethylbenzenesulfonic acid (NH₂, SO₃H, 4-CH₃, 5-CH₃ on benzene) | 3-methyl-1-(3-sulfophenyl)-5-hydroxypyrazole | $Ca^{2\oplus} + Zn^{2\oplus}$ | orange yellow |
| 27 | 2-amino-5-chloro-4-methoxybenzenesulfonic acid | 3-methyl-1-(3-sulfophenyl)-5-hydroxypyrazole | $Ca^{2\oplus} + Ba^{2\oplus}$ | orange yellow |
| 28 | 2-amino-4-methoxy-5-acetylaminobenzenesulfonic acid | 3-methyl-1-(3-sulfophenyl)-5-hydroxypyrazole | $Cs^{\oplus} + Ca^{2\oplus}$ | orange |
| 29 | 2-amino-5-ethyl-4-chlorobenzenesulfonic acid | 3-methyl-1-(3-sulfophenyl)-5-hydroxypyrazole | $Ca^{2\oplus} + Ba^{2\oplus}$ | yellow |
| 30 | 2-amino-4,5-dichlorobenzenesulfonic acid | 3-methyl-1-(2-chloro-5-sulfophenyl)-5-hydroxypyrazole | $Ca^{2\oplus} + Ba^{2\oplus}$ | greenish yellow |

-continued

| Example No. | Amine | Coupling component | Cations | Shade in soft PVC (0.2% pigment concentration) |
|---|---|---|---|---|
| 31 | 2-amino-4,5-dichlorobenzenesulfonic acid (NH₂, SO₃H, 4-Cl, 5-Cl) | 1-(2-methoxy-5-methoxy-4-sulfophenyl)-3-methyl-5-hydroxypyrazole | $Ca^{2\oplus} + Ba^{2\oplus}$ | greenish yellow |
| 32 | 2-amino-4,5-dichlorobenzenesulfonic acid | 1-(2,5-dichloro-4-sulfophenyl)-3-methyl-5-hydroxypyrazole | $Ca^{2\oplus} + Ba^{2\oplus}$ | greenish yellow |
| 33 | 2-amino-4,5-dichlorobenzenesulfonic acid | 1-(2-chloro-3-sulfophenyl)-3-ethoxycarbonyl-5-hydroxypyrazole | $Ca^{2\oplus} + Ba^{2\oplus}$ | greenish yellow |
| 34 | 2-amino-4,5-dichlorobenzenesulfonic acid | 1-(4-sulfophenyl)-3-(N-methylcarbamoyl)-5-hydroxypyrazole | $Ca^{2\oplus} + Ba^{2\oplus}$ | orange |

| Example No. | Amine | Coupling component | Cations | Shade in soft PVC (0.2% pigment concentration) |
|---|---|---|---|---|
| 35 | 2-amino-4,5-dichlorobenzenesulfonic acid (NH₂, SO₃H, Cl, Cl) | 1-(4-sulfophenyl)-3-methyl-4-(acetylamino)pyrazol-5-one type (NHCOCH₃, HO, N–N, SO₃H) | $Ca^{2\oplus} + Ba^{2\oplus}$ | yellow |

EXAMPLE 36

12.1 parts of 2-amino-4,5-dichlorobenzenesulfonic acid are dissolved in 90 parts of deionised water and 5.1 parts by volume of 30% sodium hydroxide solution. To the clear reddish-violet solution are added 8.9 parts by volume of 37% hydrochloric acid. The resultant white thick suspension is cooled to 5° C. and then 12.5 parts by volume of 4N sodium nitrite solution are added over 10 minutes. To the resultant light beige suspension there is added dropwise over 5 minutes a solution of 14.4 parts of 1-(3-sulfophenyl)-3-methylpyrazol-5-one, 100 part of distilled water and 10.1 parts by volume of 30% sodium hydroxide solution. The orange suspension so obtained, which has a pH of 6, is stirred for 2 hours, during which time the temperature of the suspension rises from 5° C. to 22° C. This suspension is then heated to 80° C. and 11.3 parts of calcium chloride are added. The mixture is stirred for 16 hours at 80° C. and filtered hot. The filter residue is washed with 100 parts by volume of deionised water and vacuum dried at 60° C., affording 27.1 parts (99% of theory) of a product that is virtually identical in structure and quality to the products of Examples 1 to 7.

| Metal analysis | Ca | Na |
|---|---|---|
| theory | 3.54% | 406% |
| found | 3.87% | 3.95% |

EXAMPLE 37

2.6 parts of 2-amino-4,5-dichlorobenzenesulfonic acid, calcium salt, and 2.7 parts of 1-(3sulfophenyl)-3-methylpyrazol-5-one, sodium salt, are dissolved at 30° C. in a mixture of 55 parts by volume of dimethylformamide, 55 parts of distilled water and 55 parts by volume of acetic acid. The orange solution is treated dropwise at 26° C. over 10 minutes with 2.55 parts by volume of 4N sodium nitrite solution. An orange precipitate forms and the temperature rises to 29° C. After stirring for 5 hours the temperature falls to 23° C. The residue is thoroughly pressed, washed with 100 parts of deionised water and dried under vacuum at 60° C. There are obtained 4.3 parts of an orange powder.

| Metal analysis | Ca | Na |
|---|---|---|
| theory | 1.77% | 6.09% |
| found | 1.60% | 6.42% |

EXAMPLE 38

0.6 g of the product obtained according to Example 1 is mixed together with 67 g of polyvinylchloride, 33 g of dioctylphthalate, 2 g of dibutyltin dilaurate and 2 g of titanium dioxide and processed to a thin sheet on a roll mill for 15 minutes at 160° C. The thin yellow sheet so obtained is coloured in a strong yellow shade which is fast to migration and light.

EXAMPLE 39

A mixture consisting of 1.0 g of the product obtained in Example 1, 1.0 g of antioxidant (IRGANOX ® 1010, CIBA-GEIGY AG) and 1000 g of high density polyethylene granules (VESTOLEN ® A 60-16, HUELS) is premixed for 15 minutes in a glass bottle on a roller gear table. The mixture is then extruded in two passes in a single screw extruder. The granulate so obtained is moulded to plates at 220° C. in an injection moulding machine (Allround Aarburg 200) and then post-formed for 5 minutes at 180° C. The mouldings are coloured in strong yellow shades of excellent fastness properties.

What is claimed is:

1. Mixed crystals of at least two different compounds of formula III

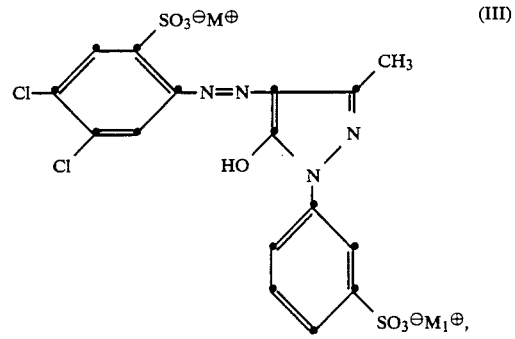

wherein M⁺ and M₁⁺ are each independently of the other Na⁺, NH₄⁺ or (Ca/2)⁺, and
wherein at least two of the cations M⁺ and M₁⁺ in the compounds of formula III forming the mixed crystals are different and the X-ray diffraction patterns of the mixed crystals differ from the X-ray diffraction patterns of the individual components and of their sum.

2. Mixed crystals according to claim 1 wherein M⁺ and M₁⁺ are each independently of the other Na⁺ or (Ca/2)⁺.

* * * * *